United States Patent
Pudney et al.

(10) Patent No.: US 10,856,255 B2
(45) Date of Patent: Dec. 1, 2020

(54) METHODS AND SYSTEMS OF PAGING IN CELLULAR NETWORKS

(71) Applicant: VODAFONE IP LICENSING LIMITED, Newbury (GB)

(72) Inventors: Christopher David Pudney, Newbury (GB); Eric Albert Bouton, Newbury (GB); Alexej Kulakov, Newbury (GB)

(73) Assignee: VODAFONE IP LICENSING LIMITED, Newbury (GB)

( * ) Notice: Subject to any disclaimer, the term of this patent is extended or adjusted under 35 U.S.C. 154(b) by 0 days.

(21) Appl. No.: 16/257,975

(22) Filed: Jan. 25, 2019

(65) Prior Publication Data

US 2019/0261311 A1    Aug. 22, 2019

Related U.S. Application Data

(63) Continuation of application No. 14/829,515, filed on Aug. 18, 2015, now Pat. No. 10,194,416.

(30) Foreign Application Priority Data

Aug. 18, 2014    (GB) .................................. 1414621.1

(51) Int. Cl.
*H04W 72/00*    (2009.01)
*H04W 68/02*    (2009.01)
(Continued)

(52) U.S. Cl.
CPC ......... *H04W 68/02* (2013.01); *H04W 72/048* (2013.01); *H04W 8/06* (2013.01);
(Continued)

(58) Field of Classification Search
CPC ...... H04W 72/04; H04W 28/16; H04W 76/00
See application file for complete search history.

(56) References Cited

U.S. PATENT DOCUMENTS

| | | | |
|---|---|---|---|
| 8,700,059 | B1 | 4/2014 | Vivanco et al. |
| 2003/0162553 | A1 | 8/2003 | Huang et al. |

(Continued)

FOREIGN PATENT DOCUMENTS

| | | |
|---|---|---|
| CN | 102421160 | 4/2012 |
| EP | 2930986 | 10/2015 |

(Continued)

OTHER PUBLICATIONS

3rd Generation Partnership Project; Technical Specification Group Radio Access Netowrk; Evolved Universal Terrestrial Radio Access Network (E-UTRAN); S1 Application Protocol (S1AP) (Release 11), 3GPP Standard; 3GPP TS 36.413, France, vol. RAN WG3, No. V11.7.0, Jun. 26, 2014 (Jun. 26, 2014), pp. 1-274. (XP050774363).

(Continued)

*Primary Examiner* — Shantell L Heiber
(74) *Attorney, Agent, or Firm* — Workman Nydegger; Shane K. Jensen

(57) ABSTRACT

A paging procedure of a mobile telecommunications system is modified to page a terminal using all the transceiver node cells in the coverage area allocated to the terminal that operate in the frequency bands indicated by frequency band capability data for the terminal, but not using the transceiver node cells in the coverage area allocated to the terminal that operate only in other ones of the frequency bands. In one embodiment a control entity is operable to initiate an initial paging procedure by paging based on the characteristic of the terminal obtained by the control entity, and to initiate a subsequent paging procedure if no paging response is received from the terminal. In another embodiment, coverage area allocation means allocates each of the transceiver node cells to one or more of the coverage areas in dependence upon on which of the frequency bands the cell is capable of communicating.

15 Claims, 8 Drawing Sheets

(51) Int. Cl.
    *H04W 72/04* (2009.01)
    *H04W 8/06* (2009.01)
    *H04W 60/04* (2009.01)
    *H04W 8/22* (2009.01)
    *H04W 68/08* (2009.01)

(52) U.S. Cl.
    CPC .............. *H04W 8/22* (2013.01); *H04W 60/04* (2013.01); *H04W 68/08* (2013.01)

(56) References Cited

U.S. PATENT DOCUMENTS

| | | | |
|---|---|---|---|
| 2004/0248573 A1 | 12/2004 | Wendel | |
| 2007/0015523 A1 | 1/2007 | Prakash et al. | |
| 2008/0220782 A1* | 9/2008 | Wang | H04W 4/08 455/436 |
| 2009/0059835 A1* | 3/2009 | Motegi | H04L 12/185 370/312 |
| 2010/0069062 A1 | 3/2010 | Horn et al. | |
| 2010/0220680 A1 | 9/2010 | Ramankutty et al. | |
| 2010/0227627 A1* | 9/2010 | Ishii | H04W 88/02 455/456.2 |
| 2010/0279697 A1* | 11/2010 | Yang | H04W 24/08 455/446 |
| 2011/0238834 A1 | 9/2011 | Nair et al. | |
| 2011/0299469 A1* | 12/2011 | Kang | H04W 68/00 370/328 |
| 2012/0002626 A1* | 1/2012 | Wang | H04W 68/00 370/329 |
| 2013/0039287 A1* | 2/2013 | Rayavarapu | H04W 76/28 370/329 |
| 2013/0077575 A1* | 3/2013 | Vadlamudi | H04W 24/06 370/329 |
| 2014/0155109 A1 | 6/2014 | Vaidya et al. | |
| 2016/0050643 A1 | 2/2016 | Pudney et al. | |

FOREIGN PATENT DOCUMENTS

| | | |
|---|---|---|
| WO | 2011087408 | 7/2011 |
| WO | 2014-101230 | 7/2014 |

OTHER PUBLICATIONS

European Search Report for Application No. GB 1414621.1 dated Feb. 24, 2016.
Alcatel-Lucent, "Paging Optimization" 3GPP TSG-RAN3 Meeing #89, Beijing China, Aug. 15, 2015.
GSM Association, "Advancing 3GPP Networks: Optimisation and Overload Management Techniques to Support Smart Phones Security Classification—Non Confidential GSMA White Paper" Jun. 1, 2012, pp. 1-42.
Partial European Search Report for Application No. EP 15181345 dated Dec. 14, 2015.
European Search Report for Application No. GB 1414621.1 dated Dec. 23, 2014.
Examination Report for GB Patent Application No. 1414621.1 dated May 13, 2020.

* cited by examiner

METHODS AND SYSTEMS OF PAGING IN CELLULAR NETWORKS

CROSS-REFERENCE TO RELATED APPLICATIONS

This application is a continuation of U.S. patent application Ser. No. 14/829,515 filed on Aug. 18, 2015, entitled "METHODS AND SYSTEMS OF PAGING IN CELLULAR NETWORKS," which claims priority to United Kingdom Application Serial No. 1414621.1 filed on Aug. 18, 2014, both of which applications are incorporated herein by reference in their entirety.

BACKGROUND OF THE INVENTION

1. The Field of the Invention

This invention relates to a mobile telecommunications system including a plurality of coverage areas; a plurality of transceiver node cells operable to communicate wirelessly with a plurality of terminals, each of the transceiver node cells serving one of the coverage areas and having a capability to communicate using at least one frequency band, wherein each of the terminals is allocated to one of the coverage areas and wherein each of the terminals has a capability to communicate using at least one frequency band; and a control entity operable to initiate a paging procedure for one of the terminals in the coverage area allocated thereto using the transceiver node cells serving that coverage area.

This invention also relates to a mobile telecommunications system including a plurality of coverage areas; a plurality of transceiver node cells operable to communicate wirelessly with a plurality of terminals, each of the transceiver node cells serving one of the coverage areas, wherein each of the terminals is allocated to one of the coverage areas; and a control entity operable to initiate a paging procedure for one of the terminals in the coverage area allocated thereto using the transceiver node cells serving that coverage area, wherein the terminal is operable to report to the control entity the identity of the cell on which it is camped for the purpose of allocating the terminal to one of the coverage areas.

2. Background

When a user equipment (UE) is in idle state, its location is only known by the network at routing/location/tracking area level (rather than at cell level when the UE is in active state).

In LTE, for example, the tracking area code (TAC) is a configurable network identifier that is composed of at least one cell, but which can also comprise a number or cells or base stations/transceiver nodes (eNBs). This includes multi-frequency eNBs, which are considered to have one cell per frequency band. Typically, an operator would configure a TAC to include a large number of cells to cover a region or a city. As the UE only signals to the network when it updates its TA (by means of a tracking area update, TAU), this ensures the signalling load is kept low in areas where the number of UEs is large.

In the idle state, the network only has knowledge of the location of a UE at TA level. If the core network needs to send a paging message to this UE, it will have to instruct all cells included in the TA(s) in which this UE is registered to do so. This can result in a large paging overhead.

BRIEF SUMMARY OF THE INVENTION

In a first aspect the present invention provides a mobile telecommunications system including: a plurality of coverage areas; a plurality of transceiver node cells operable to communicate wirelessly with a plurality of terminals, each of the transceiver node cells serving one of the coverage areas and having a capability to communicate using at least one frequency band, wherein each of the terminals is allocated to one of the coverage areas and wherein each of the terminals has a capability to communicate using at least one of the frequency bands; and a control entity operable to initiate a paging procedure for one of the terminals in the coverage area allocated thereto using the transceiver node cells serving that coverage area; characterised in that: the control entity is operable to obtain frequency band capability data for the terminal, which indicates all of the frequency bands in which the terminal is capable of communicating, and the paging procedure is modified to page the terminal using all the transceiver node cells in the coverage area allocated to the terminal that operate in the frequency bands indicated by the frequency band capability data for the terminal, but not using the transceiver node cells in the coverage area allocated to the terminal that operate only in other ones of the frequency bands.

In a first embodiment the control entity is operable to provide the frequency band capability data to the transceiver node cells serving the coverage area, the transceiver node cells serving the coverage area being configured to only page the terminal if they operate in the frequency bands indicated by the frequency band capability data for the terminal.

In a second embodiment the control entity is operable to page the terminal by sending a paging message that is received by only the transceiver node cells serving the coverage area that communicate in frequency bands corresponding to the frequency band capability data for the terminal.

The control entity may be operable to obtain a characteristic of the terminal in relation to the system, and wherein the control entity is operable to initiate an initial paging procedure by paging only the cell based on the characteristic of the terminal obtained by the control entity, and to subsequently initiate the modified paging procedure if no paging response is received from the terminal. The characteristic of the terminal obtained by the control entity may be at least one of: the identity of the cell on which it is camped at a particular time and the frequency band selected by the terminal at a particular time.

As a consequence of the procedure for allocating the terminal to one of the coverage areas (e.g. on initial attach or coverage area update, such as RAU/LAU/TAU), the network will be aware of the cell on which the UE is camped at the time of attach or coverage area update/TAU. Within the last RA/LA/TA the UE was registered to, the network also has knowledge on which frequency the UE used to communicate, based on a previous session or an attach procedure. However, as the UE might have since moved frequencies and/or cells (within the same RA/LA/TA), so the network does not know with certainty the cell or frequency band currently used by the UE. In accordance with one embodiment, the paging is first done on the last known frequency or cell and then, if no response is received, a subsequent paging procedure is performed. In the subsequent procedure, the UE may be paged in all cells in accordance with the TAI list, in accordance with a conventional paging procedure. Alternatively, in the subsequent procedure, the UE may be paged in accordance with a paging procedure of one of the embodiments described below.

Current networks and handsets are built to behave according to a standardised 3 gpp paging procedure, which does not include paging a specific UE only on the frequencies supported by this UE. Rather, as explained in the technical background, UEs are paged on a tracking area basis on all frequencies in use in the tracking area.

Different UEs support different sets of frequency bands. These sets are not necessarily the same as the ones used by the network. In this case, it would be impossible for this UE to camp on certain frequency bands. Thus, paging the UE in these non-supported bands is a waste of resources.

Currently, as mentioned before, the core network does not inspect a UE's radio access capabilities. Thus, it will instruct all cells in the specific TA(s) in which the UE is registered to send a paging message to a UE, regardless of the relevance of the frequencies of these cells. Some embodiments of the present invention address this issue.

The control entity may be a core network node suitable for initiating a paging procedure. Preferably the core network node is a mobility management entity.

In a second aspect (third embodiment) the present invention provides a mobile telecommunications system including: a plurality of coverage areas; a plurality of transceiver node cells operable to communicate wirelessly with a plurality of terminals, each of the transceiver node cells serving one of the coverage areas, wherein each of the terminals is allocated to one of the coverage areas; and a control entity operable to initiate a paging procedure for one of the terminals in the coverage area allocated thereto using the transceiver node cells serving that coverage area, wherein the control entity (MIME) is operable to obtain a characteristic of the terminal (UE 1) in relation to the system; characterised in that: the control entity (MME) is operable to initiate an initial the paging procedure by paging based on the characteristic of the terminal (UE 1) obtained by the control entity (MIME), and to initiate a subsequent paging procedure if no paging response is received from the terminal (UE 1).

In a third aspect (fourth embodiment) the present invention provides a mobile telecommunications system including: a plurality of coverage areas; a plurality of transceiver node cells operable to communicate wirelessly with a plurality of terminals, each of the transceiver node cells serving one of the coverage areas and having a capability to communicate using at least one frequency band, wherein each of the terminals is allocated to one of the coverage areas and wherein each of the terminals has a capability to communicate using at least one of the frequency bands; and a control entity operable to initiate a paging procedure for one of the terminals in the coverage area allocated thereto using the transceiver node cells serving that coverage area; characterised by: coverage area allocation means operable to allocate each of the transceiver node cells to one or more of the coverage areas in dependence upon on which of the frequency bands the cell is capable of communicating.

In the embodiments each of the coverage areas is served a plurality of the transceiver node cells.

In the embodiments the coverage areas comprise at least one of tracking areas, routing areas or location areas.

In the embodiments a control entity is operable to perform a paging procedure when the terminals are in an idle or inactive state.

In the embodiments the system is operable to change the coverage area to which the terminal is allocated in response to movement of the terminal.

In the embodiments the control entity is operable to obtain and store data indicative of the frequency bands on which the terminals are capable of communicating.

The present invention also provides methods corresponding to the system, as defined in the claims.

In telecommunications systems, one or more cells may be provided by a transceiver node—such as a base station (2G), a NodeB (3G) or an eNodeB (LTE). The "term transceiver node cell" may refer to such cells, but may also include elements of the transceiver node itself, such as elements that receive and process data from the control entity.

The embodiments to be described provide arrangements that may reduce the overhead the paging procedure creates.

BRIEF DESCRIPTION OF THE DRAWINGS

For a better understanding of the present invention embodiments will now be described by way of example, with reference to the accompanying drawings, in which.

In the drawings like elements are generally designated with the same reference sign.

DETAILED DESCRIPTION OF THE PREFERRED EMBODIMENTS

Figure 1:
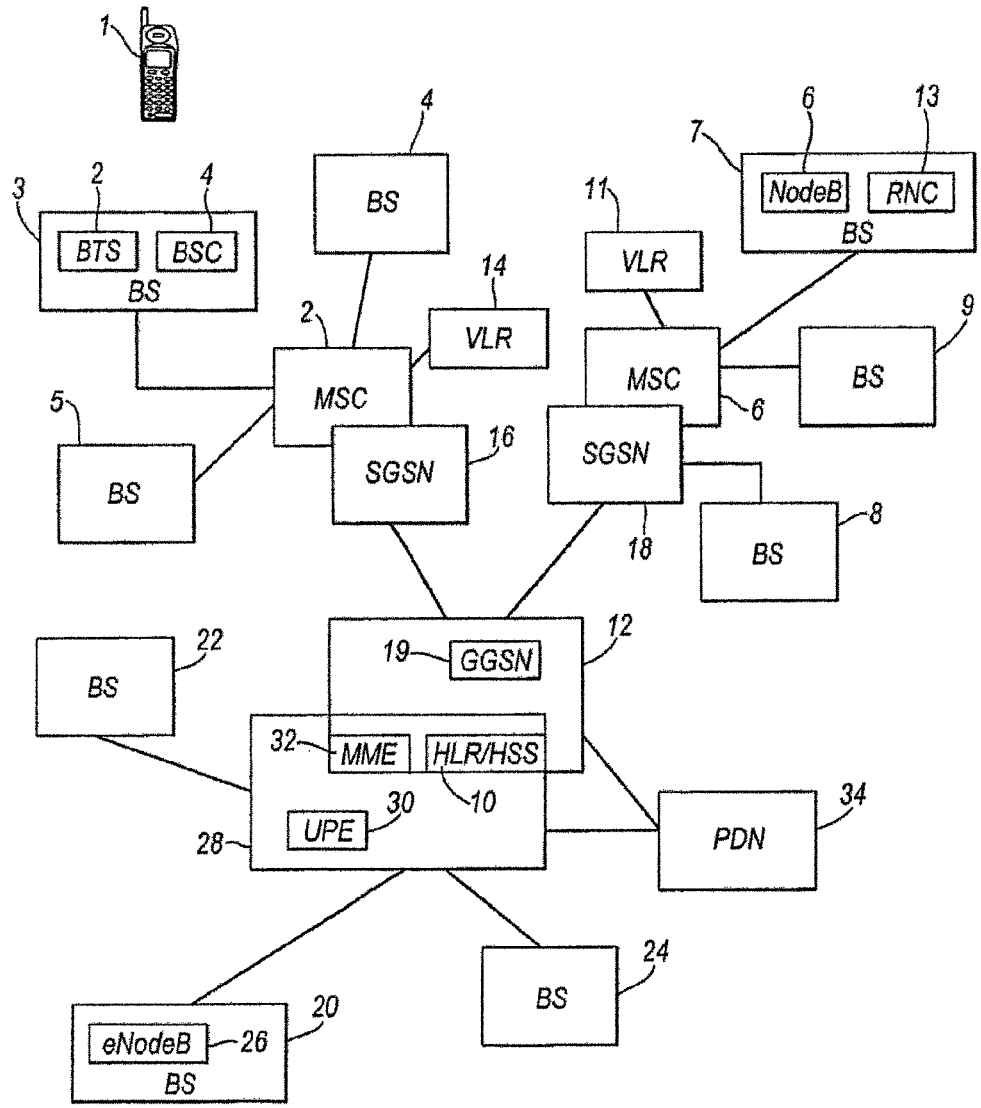
FIG. 1 is a diagrammatic drawing of key elements of a mobile telecommunications network for use in explaining the operation of such a network.

Key elements of a mobile telecommunications network, and its operation, will now briefly be described with reference to FIG. 1.

Each base station/transceiver node (BS) provides on or more cells of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment-UE) is shown at 1. The mobile terminal may be a handheld mobile telephone, a personal digital assistance (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 2 and a base station controller (BSC) 4. A BSC may control more than one BTS. The BTSs and BSCs comprise the radio access network.

In a UMTS (3G) mobile telecommunications network, a radio network controller (RNC) 13 may control more than one node B6. The node B's and RNC's comprise the radio access network.

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is the subscriber's telephone number, by means of which calls to the subscriber are initiated by callers. This number is the MSISDN.

The network includes a home location register (HLR)/ home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 2. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and passed on to the MSC 2. The MSC 2 routes the calls towards the called party via the MSC 2. By means of the information held in the VLR 14, MSC 2 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain. GGSN 19 provides IP connectivity for the CN 12.

From the description above, it will be understood that the coverage area of a mobile telecommunications network is divided into a plurality of cells, each of which is served by a respective base station/transceiver node. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

When a calling party (whether an entity within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call or data to be received. If the network knew in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell which is occupied by a terminal is always known, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) in addition to the data mentioned above indicative of the identity of its location area. The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update (RAU). The routing area is updated in the same manner as the location area, as discussed above.

A mobile terminal has an active mode and an idle/inactive mode.

For 2G and 3G, a mobile terminal is in active communication when it has a CS (Circuit Switched) connection established. For SAE/LTE, CS connections are not used.

In 2.5G, GPRS PS (Packet Switched), active communication can be defined as the GPRS Ready state. In 3G UMTS PS, active communication can be defined as the all of RRC connected mode states excluding URA PCH. In LTE, active communication can be defined as the Active state.

In 3G UMTS PS, URA PCH can be defined as an inactive state. In GPRS, the Standby state can be regarded as an inactive state.

Either one or both of the CS and PS active communications may occur in the mobile terminal.

Whilst in 2G or 3G idle mode, a mobile terminal has no CS connection. In the idle and inactive mode the mobile terminal implements cell selection and reselection procedures. The mobile terminal is registered on the network, and listens for paging messages. The mobile terminal performs location area updates when necessary. The idle state in GPRS indicates that the mobile has not yet registered onto the network or is switched off.

For a 3G mobile terminal, in the active mode the terminal is in the RRC (Radio Resource Control) connected mode. The RRC connected mode includes the following three active states and one inactive (URA PCH) state:

CELL_DCH state is characterized by: [0064] A dedicated physical channel is allocated to the UE in uplink and downlink. [0065] The UE is known on cell level according to its current active set [0066] Dedicated transport channels, downlink and uplink (TDD) shared transport channels and a combination of these transport channels can be used by the UE.

CELL_FACH state is characterized by: [0068] No dedicated physical channel is allocated to the UE. [0069] The UE continuously monitors a FACH (forward access channel) in the downlink. [0070] The UE is assigned a default common or shared transport channel in the uplink (e.g. RACH) that it can use anytime according to the access procedure for that transport channel. [0071] The position of the UE is known by UTRAN on cell level according to the cell where the UE last made a cell update. [0072] In TDD mode, one or several USCH or DSCH transport channels may have been established.

CELL_PCH state is characterized by: [0074] No dedicated physical channel is allocated to the UE. The UE selects a PCH (paging channel) with the algorithm, and uses DRX for monitoring the selected PCH via an associated PCH. [0075] No uplink activity is possible. [0076] The position of the UE is known by UTRAN on cell level according to the cell where the UE last made a cell update in CELL_FACH state.

URA_PCH state is characterized by: [0078] No dedicated channel is allocated to the UE. The UE selects a PCH, and uses DRX for monitoring the selected PCH via an associated PCH. [0079] No uplink activity is possible. [0080] The location of the UE is known on UTRAN routing area level according to the URA assigned to the UE during the last URA update in CELL-FACH state.

Elements of an LTE network are also shown in FIG. 1. The transceiver nodes/base stations 20, 22 and 24 comprise an eNodeB (evolved Node B) 26. The RRC signalling with the mobile terminal 1 terminates at the eNode B 26, the eNode B comprising the RAN of the LTE network. The eNode B 26 performs the functions of both the Node B and a large part of the RNC of the 3G/UMTS network. The network core 28 of the LTE network includes User Plane Entity (UPE) 30, the HLR/HSS 10 (a common HLR/HSS shared with the network core 12 of the GSM/UMTS network) and also Mobility Management Entity (MME) 32 (also shared with the network core 12 of the GSM/UNITS network). A plurality of MMES and UPEs are usually provided, although only one of each is shown.

Although shown separately in FIG. 1, the UPE 30 and GGSN 19 may be combined to form a single element. For the purposes of this document, UPE 30 and GGSN 19 are considered to be a common element with one interface to Packet Data Network (PDN) 34 (for example, the Internet). Both the GSM/UMTS and LTE networks communicate with PDN 34.

As discussed above, GSM and UMTS mobile telecommunications networks are divided into location areas/routing areas. In the embodiments to be described the LTE network has the equivalent of location/routing areas (herein "tracking areas"). Tracking area updates TAUs are performed in a similar manner to RAUs and URA updates.

While an LTE device (UE) is in active state (i.e. while communicating, or while in EMM-Registered/ECM-Connected/RRC-Connected state in LTE terms), its location is known by the LTE network at cell level.

However, while the UE is in idle state (i.e. while not communicating, or while in EMM-Registered/ECM-Idle/RRC-Idle state in LTE terms), its location is known by the LTE network at TA level, instead of cell level. An operator defines a group of neighbour eNBs as a TA. A TA can be made up of cells or eNBs.

Each TA has a Tracking Area Identifier (TAI) and a Tracking Area Code (TAC). A TAC is the unique code that each operator assigns to each of their TAs. A TAI consists of a PLMN ID and a TAC. The PLMN ID is a combination of a Mobile Country Code (MCC) and a Mobile Network Code (MNC) and is the unique code assigned to each operator in the world. This format of assigning makes a TAI uniquely identified globally. The TAI corresponds to a group of cells. Knowledge of the TAI allows the possible cells occupied by a mobile terminal to be determined (e.g. by referring to a look-up table that indicated the correspondence between TAI and cells).

The MME requires updated location information about UEs in idle state to know in which TA a particular UE is located. For this, the UE notifies the LTE network (MME) of its current location by sending a Tracking Area Update (TAU) message (TAU Request message) every time it moves between TAs.

A UE obtains a TAI list when it attaches to an LTE network. This list comprises the tracking area(s) where the LTE network believes a UE is located and within which a UE can travel without TAU. The UE does not have to send a TAU message to the MME as long as it stays in the listed TA(s), but it has to send a TAU to the MME when it moves to a new TA other than the listed TA(s). On TAU the MME provides the UE with a new TAI list of appropriate TA(s) reflecting the specific details of the UE's movement (e.g. new location, moving speed, etc.) for more efficient paging.

At the time a TAU is performed, the MME may be aware of one or more characteristic of the mobile terminal in relation to the telecommunications system. For example, the MME may be aware of the current cell used by the mobile terminal and/or the MME may be aware of the frequency band used by the mobile terminal.

In addition to TAU in response to movement, Periodic TAU is also performed by which a UE in idle state sends a TAU message (TAU Request message) to an MME periodically even when the UE stays within a TA in the TAI list. If a UE in idle state has stayed in one location (or moved within the TAs in the TAI list) and has not notified the MME of its current location, the network cannot tell whether the UE is still in idle state, or is unable to communicate (e.g. is powered down). So, the UE, even when the TA is not changed, sends TAU Request messages to the MME periodically to announce it is able to receive data. Otherwise, the network believes the UE is not able to receive data and does not perform paging even when there is data traffic heading to the UE.

The paging function supports the sending of paging requests to all cells of the TA(s) for which the UE is registered. The paging function is described in 3GPP TS 36.300 (section 19.2.1.1). The paging procedure is described in 3GPP TS 36.413 (section 8.5).

Figure 2:
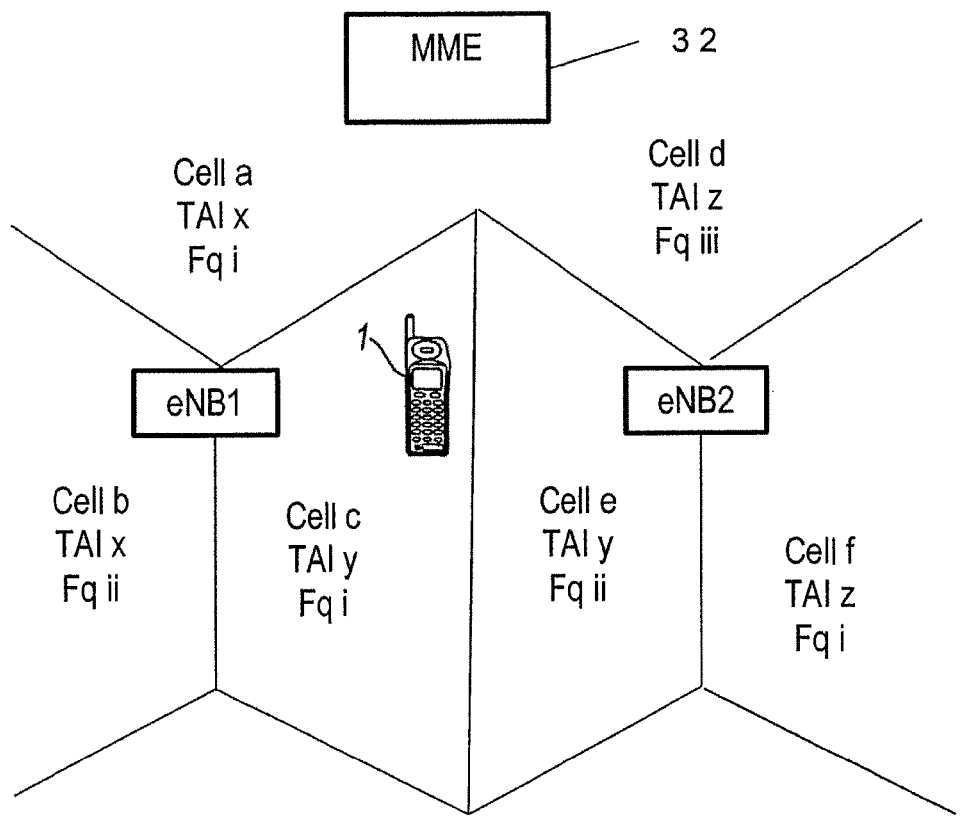
FIG. 2 shows two eNBs, each of which provides three cells (in this example)

Part of an LTE cellular network is shown in FIG. 2. The MME 32 controls mobility of UE 1. FIG. 2 shows two eNBs (eNB1 and eNB2), each of which provides three cells (in this example). The cells are each allocated to a TA as shown by the indicated TM. The frequency band on which each cell operates is also shown.

Figure 3:
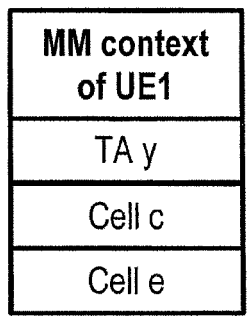
FIG. 3 shows a conventional MM context for a UE.

Paging requests are sent by a SI paging function to the relevant eNBs according to the mobility information kept in the UE's MM context in the serving MME. FIG. 3 shows a conventional MM context for UE1. It lists the current TA(s) of the UE and the cells that correspond to each of the TA(s). In the example of UE 1, the UE has a single TA, TA y. The cells corresponding to TA y are listed as cell c and cell e.

The purpose of the Paging procedure is to enable the MME to page a UE in the relevant cells of specific eNBs. The MME initiates the paging procedure by sending the PAGING message to the eNB. At the reception of the PAGING message, the eNB performs paging of the UE in cells which belong to tracking areas as indicated by the List of TAIs IE. For each cell that belongs to any of the TAs indicated in the List of TAIs IE, the eNB generates one page on the radio interface.

Figure 5:
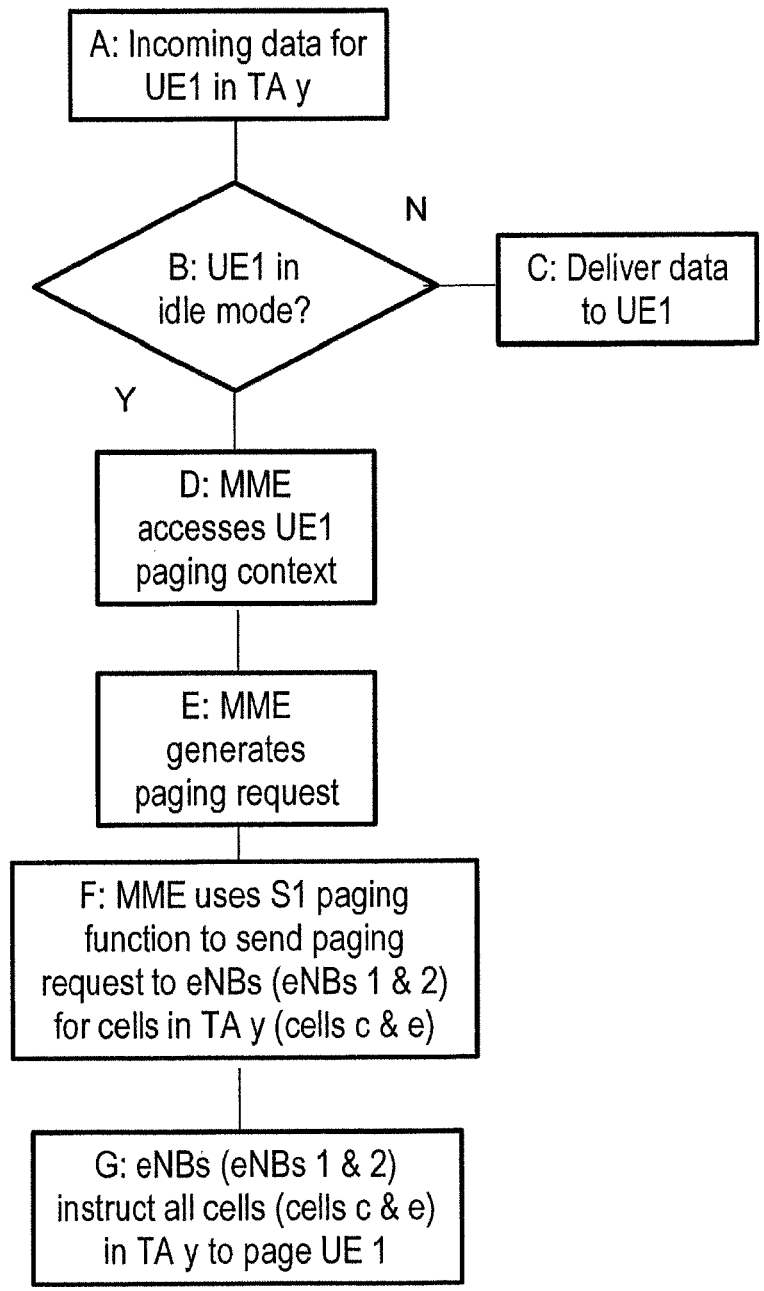
FIG. 5 is a flow chart showing a conventional paging procedure for a UE.

The conventional paging procedure for UE 1 is shown in the flow chart of FIG. 5. The steps performed in the conventional paging procedure will now be briefly described.

At step A it is determined that incoming data for UE1 is received. According to the conventional paging procedure, the tracking area occupied by the UE1 is known.

A step B it is determined whether the UE1 is in an idle (or inactive) mode of one of the types discussed above. If the UE1 is not in an idle mode (i.e. is in an active mode of communication), the location of the UE1 at a cell granularity will be known and the incoming data can be delivered directly to the UE1 in step C.

On the other hand, if it is determined that the UE1 is in an idle mode, then, at step D, the MME32 accesses a paging context for the UE1 stored on the MME32.

At step E, the MME generates a paging request.

At step F the MME uses the conventional S1 paging function to send the paging request to the eNBs for the cells in the tracking area occupied by the UE1. In the example of FIG. 2, the UE1 is in tracking area y. The tracking area y is served eNB1 and eNB2. In tracking area y eNB1 provides cell c and eNB2 provides cell e. In practice, a tracking area is likely to comprise a larger number of eNBs and a larger number of cells.

At step G the eNBs of the tracking area (eNB1 and eNB2 of tracking area y in this example) to page the UE1 using the associated cells to tracking area y (cells c and e in this example).

As shown in FIG. 2, cell e has a capability to communicate on frequency band Fq ii. In contrast, cell c has a capability to communicate on frequency band Fq i. In this example, UE1 has a capability to communicate using only frequency band Fq i. It is therefore impossible for UE1 to camp on cell e as they do not share the same frequency band capability. The paging of UE1 in cell e is therefore wasteful of resources.

The embodiments of the present invention now to be described may reduce or illuminate such waste of resources.

According to a first embodiment of the invention, the conventional procedures referred to above are modified as follows:

1. The radio access capabilities (including frequency band capabilities) of a UE are acquired by the eNB that the UE is camping on and transmitted to the mobility management entity (MME), which is (as discussed above) the core network node responsible for paging, during e.g. an attach procedure (described in TS 23.401) or a tracking area update (such as when moving from one MME to another).

Figure 4:
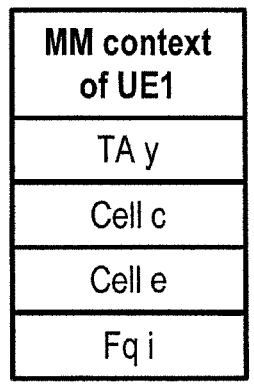
FIG. 4 shows a modified MM context for the UE.

2. The MME then builds the mobility management (MM) context for this UE (which also contains the Tracking Area Identity). The current MM context is extended (by e.g. adding a field with the UE's supported frequency bands). The modified MM context is shown in FIG. 4. In contrast to the conventional MM context shown in FIG. 3, the frequency bands on which the UE is capable of operating are added to the MM context.

Figure 6A:
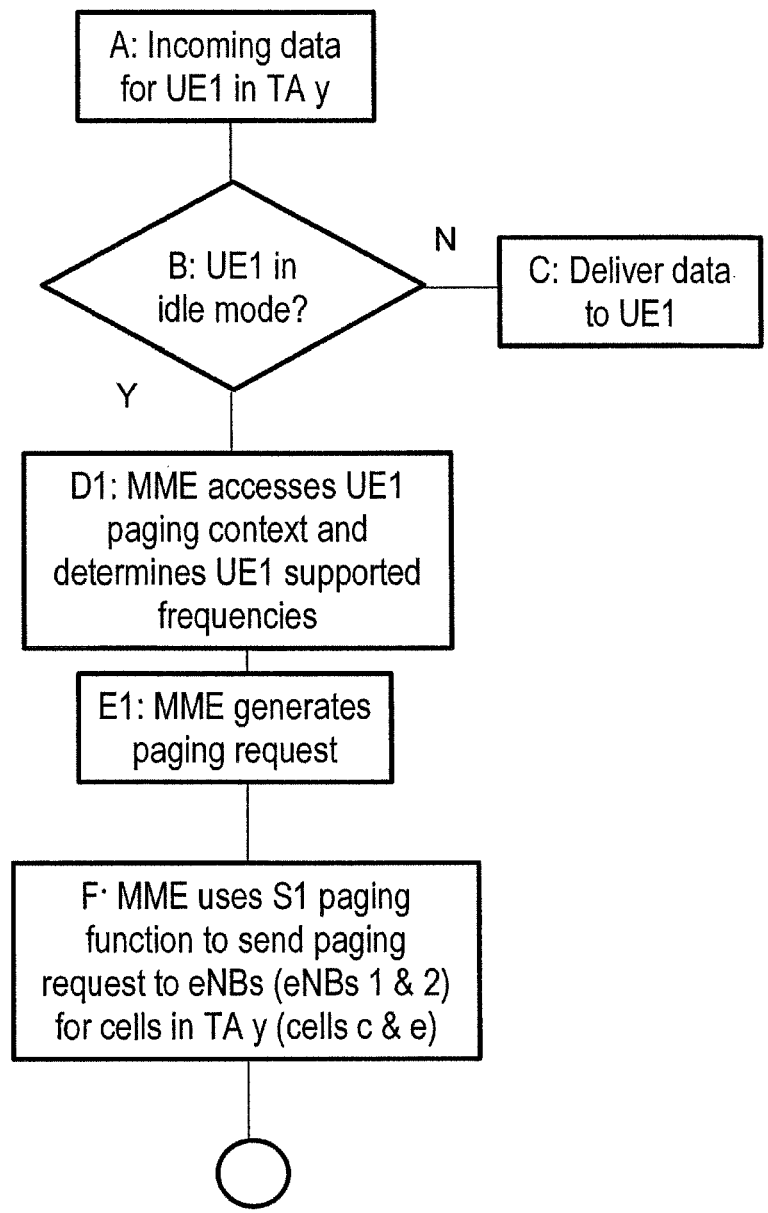
FIG. 6A-B is a flow chart showing a paging procedure for a UE in accordance with a first embodiment of the invention.
Figure 6B:
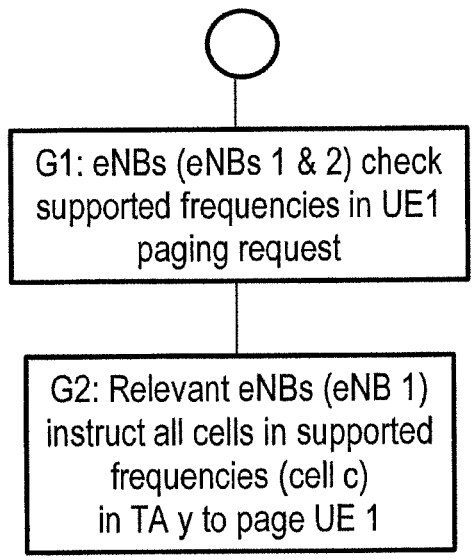

3. The conventional S1 Paging function supports paging requests to be sent to the relevant eNBs according to the mobility information kept in the UE's new extended MM context in the serving MME (i.e. the list of frequency bands that the UE supports is added to the S1 paging message, but the S1 Paging function is unchanged). Each relevant eNB then uses the list of supported frequency bands to determine on which cells (i.e. which frequency layers and sectors) to page the UE. The paging procedure in accordance with the first embodiment of the invention is shown in the flowchart of FIG. 6A, B.

At step A it is determined that incoming data for UE1 is received. According to the conventional paging procedure, the tracking area occupied by the UE1 is known.

A step B it is determined whether the UE1 is in an idle (or inactive) mode of one of the types discussed above. If the UE1 is not in an idle mode (i.e. is in an active mode of communication), the location of the UE1 at a cell granularity will be known and the incoming data can be delivered directly to the UE1 in step C.

Steps A, B and C correspond to the similarly designated steps in the flowchart of FIG. 5.

Step D1 is modified in that, when the MIME accesses the paging context for the UE1, the context is enhanced in the manner described in relation to FIG. 4 and includes frequency bands supported by the UE1.

Step E1 is modified in that the paging request generated by the MIME includes the frequency bands supported by the UE1 obtained at step D1.

At step F the MME uses the conventional S1 paging function to send the paging request to the eNBs for the cells in the tracking area occupied by the UE1. In the example of FIG. 2, the UE1 is in tracking area y. The tracking area y is served eNB1 and eNB2. In tracking area y eNB1 provides cell c and eNB2 provides cell e. In practice, a tracking area is likely to comprise a larger number of eNBs and a larger number of cells. Step F corresponds to step F of the flowchart of FIG. 5.

In step G1 the eNBs that receive the paging request (eNB1 and eNB2) retrieve the frequency bands supported by the UE1 from the paging request.

At step G2 it is determined whether each eNB cell supports the frequency band or bands supported by the UE1. If an eNB cell does support a frequency band or bands supported by the UE1, the eNB instructs the relevant cell to page the UE1. In the example of FIG. 2, eNB1 cell c supports frequency band Fq I that is also supported by the UE1. Therefore, eNB1 cell c pages UE1. On the other hand, eNB2 cell e supports only frequency band Fq ii, and so eNB2 determines that cell e should not page UE1 due to the incompatibility of frequency bands.

Figure 7A:
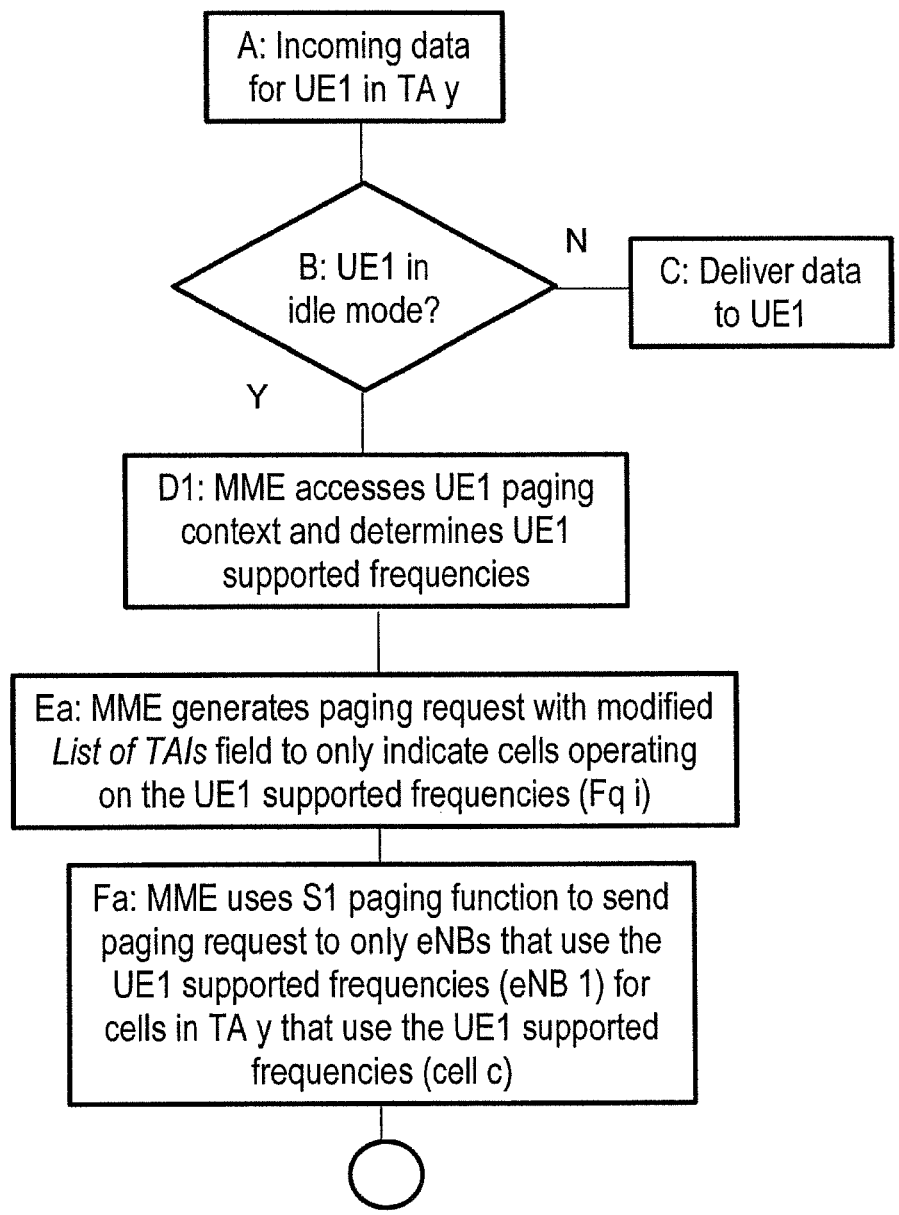
FIG. 7A-B is a flow chart showing a paging procedure for a UE in accordance with a second embodiment of the invention.
Figure 7B:
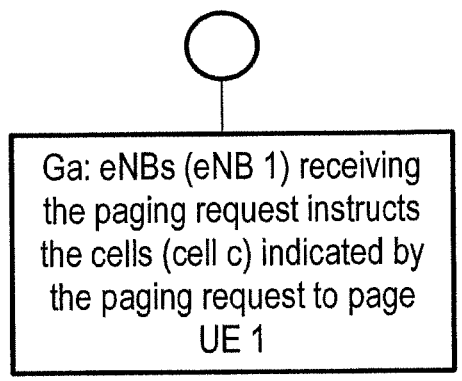

According to a second embodiment of the invention, the conventional procedures referred to above are modified as follows:

1. Same as 1. in first embodiment.
2. Same as 2. in first embodiment.
3. The conventional S1 Paging function is modified to support paging requests to be sent to a subset of the relevant eNBs or eNB cells according to a) either the mobility information kept in the UE's new extended MM context in the serving MME, or to b) the mobility information kept in the UE's (current) MM context in the serving MME and information on the UE's supported frequency bands. Indeed, the MME would either a) inspect the extended MM context, specifically looking into the UEs supported frequency bands, or b) directly inspect the UE's Radio Access Capabilities, RAC, (transmitted from the eNB). The paging procedure in accordance with the second embodiment of the invention is shown in the flowchart of FIG. 7A, B.

At step A it is determined that incoming data for UE1 is received. According to the conventional paging procedure, the tracking area occupied by the UE1 is known.

At step B it is determined whether the UE1 is in an idle (or inactive) mode of one of the types discussed above. If the UE1 is not in an idle mode (i.e. is in an active mode of communication), the location of the UE1 at a cell granularity will be known and the incoming data can be delivered directly to the UE1 in step C.

At step D1, when the MIME accesses the paging context for the UE1, the context is enhanced in the manner described in relation to FIG. 4 and includes frequency bands supported by the UE1 (or the frequency bands supported by the UE1 are obtained in some other way).

Steps A to D1 correspond to the similarly designated steps of a flowchart of FIG. 6A, B.

At step Ea the MME generates a paging request with a modified List of TAIs to only indicate cells operating on the frequency bands supported by the UE1. In this example, this is frequency band Fq i. However, it should be understood that an eNB may determine the cells operating on the frequency bands supported by the UE1 by any suitable arrangement.

At step Fa the MME uses the S1 paging function to send the paging request generated at step Ea to only eNBs that provide cells in tracking area y that are capable of communicating using the frequency band or bands supported by the UE1. In the example of FIG. 2, the eNB providing a cell with the appropriate frequency band capability (frequency band Fq i) is eNB1, which provides cell c.

At step Ga, the eNB receiving the paging request (eNB1 in this example) instructs the relevant cell (cell c in this example) indicated by the paging request to page UE1.

The MME, with knowledge of UE frequency band capability, can:

1. open up List of TAIs to determine the cells serving the TAIs and transmit the paging request only to cells that can actually reach the target UE. This requires a change in the paging function.

2. modify the cells indicated by the List of TAIs transmitted to the UE (not the list itself), only including cells that can actually reach the UE. This modified list would be indicated by the conventional paging function. There is an added advantage here, where the transmitted data may be less than the original stored one, thus reducing signalling overhead further.

According to a third embodiment of the invention, the conventional procedures referred to above are modified as follows:

1. The S1 Paging function is modified to support paging requests in a two step process. The MME may obtain a characteristic of the terminal (UE 1) in relation to the system—such as the cell occupied or the frequency band used at a particular time. For example, as part of the TAU procedure the MME would become aware of the cell in which the UE is located at the time of TAU. Similarly, as part of the TAU procedure the MME would become aware of the frequency band used by the UE1 at the time of TAU. The MME therefore has information indicating the last cell occupied/frequency band used during the UE's last TAU. In accordance with this embodiment, the paging request is first sent to the relevant cell and/or on the relevant frequency band associated with this specific TM.

2. If no paging response is received (because the UE has moved cells within the TA or has changed the frequency band used), the second step is to apply the conventional paging function (or the paging function of the first or second embodiment, discussed above).

According to a fourth embodiment of the invention, the conventional procedures referred to above are modified as follows:

1. A network operator assigns different tracking areas (or set of tracking areas) to different frequency bands. A UE will thus only be paged on the frequency it is camping on (and which it supports).

2. In an example of operation of this embodiment, one eNB has a plurality of cells. For example, a first cell which operates in the 800 MHz frequency band has, say, TACode=0010 (hex); a second cell which operates in the 900 MHz frequency band has TAC=1010; a third cell which operates in the 1800 MHz frequency band has TAC=2010; a fourth cell which operates in the 2100 frequency band has TAC=3010; etc. Then when an MME gets a TA update from UE 1 in a cell in TAC x010 the MME looks into the UE 1 radio access capabilities (RAC) of the UE 1 to see which frequency bands are supported (e.g. 800 and 1800 but not 900 and not 2100) and accordingly allocates a TM list of 0010 and 2010.

3. Later, when paging the UE 1, the S1 interface Page carries a TM list of 0010 and 2010. This tells the eNB on which frequency bands to page. Note that the MME could still have to inspect the UE's radio access capabilities. The UE 1 radio access capabilities may be obtained by a) inspecting the extended MM context (FIG. 4), specifically looking into the UEs supported frequency bands, or b) directly inspect the UE's Radio Access Capabilities, RAC, (transmitted from the eNB).

4. The TAU Accept message from the MME to the UE contains a "List of TA IDs" and the UE does its next TAU when the mobile is no longer in any of the TAs in the List.

Although the embodiments described relate to LTE cellular networks, the invention is also applicable to other cellular networks—such as 2G, 3G and 5G networks.

The term "transceiver node" used herein includes any (wireless) node that allows wireless connection of a UE to the wireless network, and includes a base station, cell site, BTS, NodeB, eNodeB, access point, access node, femto cell and pico cell, as well as the MeNBs and SeNBs mentioned in the embodiment.

What is claimed is:

1. A mobile telecommunications system comprising:
a plurality of coverage areas;
a plurality of transceiver node cells configured to communicate wirelessly with a plurality of terminals, each of the transceiver node cells serving one of the coverage areas and having a capability to communicate using at least one frequency band, wherein each of the terminals is allocated to one of the coverage areas and wherein each of the terminals has a capability to communicate using at least one of the frequency bands; and
a controller configured to initiate a paging procedure for one of the terminals in the coverage area allocated thereto using the transceiver node cells serving that coverage area and configured to obtain frequency band capability data for the terminal, which indicates all of the frequency bands in which the terminal is capable of communicating, the paging procedure including extending a paging message that is to be sent for the one of the terminals, the paging message being extended to include a list of frequency bands that the one of the terminals supports while also ensuring that a paging function of the paging message is unchanged,
wherein the paging procedure is modified to page the terminal using all the transceiver node cells in the coverage area that operate in the frequency bands indicated by the frequency band capability data for the terminal, but not using the transceiver node cells in the coverage area that operate only in other ones of the frequency bands,
wherein the controller is further configured to perform the paging procedure when the terminals are in an idle or inactive state, and wherein, while a particular one of the terminals is in the idle or inactive state, the controller periodically receives, from the particular terminal, a tracking area update (TAU) message that includes information regarding a current location of the particular terminal.

2. The system of claim 1, wherein the controller is configured to provide the frequency band capability data to the transceiver node cells serving the coverage area, the transceiver node cells serving the coverage area being configured to only page the terminal if they operate in the frequency bands indicated by the frequency band capability data for the terminal.

3. The system of claim 1, wherein the controller is configured to page the terminal by sending the paging message, which is received by only the transceiver node cells serving the coverage area that communicate in frequency bands corresponding to the frequency band capability data for the terminal.

4. The system of claim 1, wherein the controller is configured to obtain a characteristic of the terminal in relation to the system, and wherein the controller is configured to initiate an initial paging procedure by paging based on the characteristic of the terminal obtained by the controller and to subsequently initiate the modified paging procedure if no paging response is received from the terminal.

5. The system of claim 4, wherein the characteristic of the terminal obtained by the controller is at least one of: an identity of the cell on which the terminal is camped at a particular time and the frequency band selected by the terminal at a particular time.

6. The system of claim 1, wherein each of the coverage areas is served by a plurality of the transceiver node cells.

7. The system of claim 1, wherein the coverage areas comprise at least one of tracking areas, routing areas or location areas.

8. The system of claim 1, wherein the system changes the coverage area to which the terminal is allocated in response to movement of the terminal.

9. The system of claim 1, wherein the controller is configured to obtain and store data indicative of the frequency bands on which the terminals are capable of communicating.

10. The mobile telecommunications system of claim 1, wherein the controller provides the particular terminal a tracking area identifier (TAI) list when the particular terminal attaches to a network of the mobile telecommunications system, the TAI list comprising tracking areas where the network determines the particular terminal is purportedly located and within which the particular terminal can travel without sending a reporting TAU message, and wherein the controller receives, from the particular terminal, both the periodic TAU message and the reporting TAU message while the particular terminal is in the idle or inactive state.

11. A method of operating a mobile telecommunications system including a plurality of coverage areas, a plurality of transceiver node cells configured to communicate wirelessly with a plurality of terminals, each of the transceiver node cells serving one of the coverage areas and having a capability to communicate using at least one frequency band, wherein each of the terminals is allocated to one of the coverage areas and wherein each of the terminals has a capability to communicate using at least one of the frequency bands, the method comprising:

initiating, via a controller, a paging procedure for one of the terminals in the coverage area allocated thereto using the transceiver node cells serving that coverage area, the paging procedure including extending a paging message that is to be sent for the one of the terminals, the paging message being extended to include a list of frequency bands that the one of the terminals supports while also ensuring that a paging function of the paging message is unchanged;

obtaining, via the controller, frequency band capability data for the terminal, which indicates all of the frequency bands in which the terminal is capable of communicating; and modifying the paging procedure to page the terminal using all the transceiver node cells in the coverage area that operate in the frequency bands indicated by the frequency band capability data for the terminal, but not using the transceiver node cells in the coverage area that operate only in other ones of the frequency bands, wherein the controller is further configured to perform the paging procedure when the terminals are in an idle or inactive state, and wherein, while a particular one of the terminals is in the idle or inactive state, the controller periodically receives, from the particular terminal, a tracking area update (TAU) message that includes information regarding a current location of the particular terminal.

12. The method of claim 11, further comprising:

providing, via the controller, the frequency band capability data to the transceiver node cells serving the coverage area, the transceiver node cells serving the coverage area being configured to only page the terminal if they operate in the frequency bands indicated by the frequency band capability data for the terminal.

13. The method of claim 11, further comprising:

paging, via the controller, the terminal by sending the paging message, which is received by only the transceiver node cells serving the coverage area that communicate in frequency bands corresponding to the frequency band capability data for the terminal.

14. The method of claim 11, further comprising:

obtaining, via the controller, a characteristic of the terminal in relation to the system; and initiating, via the controller, an initial paging procedure by paging based on the characteristic of the terminal obtained by the controller and to subsequently initiate said modified paging procedure if no paging response is received from the terminal.

15. The method of claim 14, wherein the characteristic of the terminal obtained by the controller is at least one of: an identity of the cell on which it is camped at a particular time and the frequency band selected by the terminal at a particular time.

* * * * *